(12) United States Patent
Broomfield et al.

(10) Patent No.: US 11,791,675 B2
(45) Date of Patent: Oct. 17, 2023

(54) HOUSING FOR A ROTARY ELECTRIC MACHINE AND ASSOCIATED LAMINATIONS

(71) Applicant: LC ADVANCED MOTOR TECHNOLOGY CORPORATION, New York, NY (US)

(72) Inventors: Dylan Broomfield, Gansevoort, NY (US); Russel Hugh Marvin, Potsdam, NY (US); Matthew Honickman, Potsdam, NY (US)

(73) Assignee: LC Advanced Motor Technology Corporation, New York, NY (US)

( * ) Notice: Subject to any disclaimer, the term of this patent is extended or adjusted under 35 U.S.C. 154(b) by 478 days.

(21) Appl. No.: 16/810,906

(22) Filed: Mar. 6, 2020

(65) Prior Publication Data

US 2021/0281129 A1  Sep. 9, 2021

(51) Int. Cl.
  *H02K 1/18* (2006.01)
  *H02K 5/15* (2006.01)
  *H02K 5/06* (2006.01)

(52) U.S. Cl.
  CPC .............. *H02K 1/185* (2013.01); *H02K 5/06* (2013.01); *H02K 5/15* (2013.01)

(58) Field of Classification Search
  CPC ............ H02K 1/18; H02K 1/185; H02K 5/06; H02K 5/15
  USPC ................................ 310/89, 154.41, 216.004
  See application file for complete search history.

(56) References Cited

U.S. PATENT DOCUMENTS

| | | | | |
|---|---|---|---|---|
| 5,758,404 A | * | 6/1998 | Baumann ............... | H02K 15/16 310/90 |
| 5,806,169 A | * | 9/1998 | Trago ..................... | H02K 15/16 310/90 |
| 6,300,693 B1 | * | 10/2001 | Poag ........................ | H02K 9/19 310/58 |
| 8,299,690 B2 | * | 10/2012 | Hayakawa ............. | H02K 1/148 310/400 |
| 2013/0200745 A1 | * | 8/2013 | Knapp .................... | H02K 3/522 310/214 |
| 2014/0197701 A1 | * | 7/2014 | Hossain ................... | H02K 9/22 310/52 |
| 2014/0239753 A1 | * | 8/2014 | Buehler ................. | H02K 9/223 264/261 |
| 2017/0040852 A1 | * | 2/2017 | Byzio .................... | H02K 15/14 |
| 2017/0292524 A1 | * | 10/2017 | Huscher ................ | H02K 1/185 |

FOREIGN PATENT DOCUMENTS

| | | | | |
|---|---|---|---|---|
| GB | 2059177 A | * | 4/1981 | ............. H02K 1/185 |
| GB | 2059177 A | | 4/1981 | |

OTHER PUBLICATIONS

International Search Report for International Application No. PCT/US2021/016281, dated Apr. 13, 2021, 2 pages.
Written Opinion for International Application No. PCT/US2021/016281, dated Apr. 13, 2021, 6 pages.

* cited by examiner

*Primary Examiner* — Rashad H Johnson
(74) *Attorney, Agent, or Firm* — Darrell G. Mottley

(57) ABSTRACT

A housing for a rotary electric machine having stacked laminations forming a stator core includes a first portion forming a slip fit with a first series of the stacked laminations. A second portion forms an interference fit with a second series of the stacked laminations.

26 Claims, 6 Drawing Sheets

HOUSING FOR A ROTARY ELECTRIC MACHINE AND ASSOCIATED LAMINATIONS

TECHNICAL FIELD

The present invention relates generally to rotary electric machines, and specifically to a housing for a stator.

BACKGROUND

Attaching the housing to the stator laminations needs to handle several different functions. First off, torque generated by the electric machine needs to be transmitted from the stator laminations, to the machine housing, and then to a machine mounting surface. Therefore, the connection between the housing and the stator laminations needs to handle a lot of force. Furthermore, the housing and stator laminations need to be coaxially aligned with one another.

SUMMARY

In one example, a housing for a rotary electric machine having stacked laminations forming a stator core includes a first portion forming a slip fit with a first series of the stacked laminations. A second portion forms an interference fit with a second series of the stacked laminations.

In another example, a housing for a rotary electric machine having stacked laminations forming a stator core includes a first portion having a welded connection with a first series of the stacked laminations for transmitting torque from the first series to the first portion. A second portion forms an interference fit with a second series of the stacked laminations for centering the laminations and the housing about the same axis.

In another example, a subassembly for a rotary electric machine having stacked laminations forming a stator core includes a housing forming an interference fit with a series of the stacked laminations. An end cap has an interference fit with an end of the housing for locating the housing. Fasteners extend through the end cap for applying a compressive force to the stacked laminations for transferring torque between the end cap and the housing. The fasteners are positioned radially inward of the housing.

Other objects and advantages and a fuller understanding of the invention will be had from the following detailed description and the accompanying drawings.

DETAILED DESCRIPTION

Figure 1A:
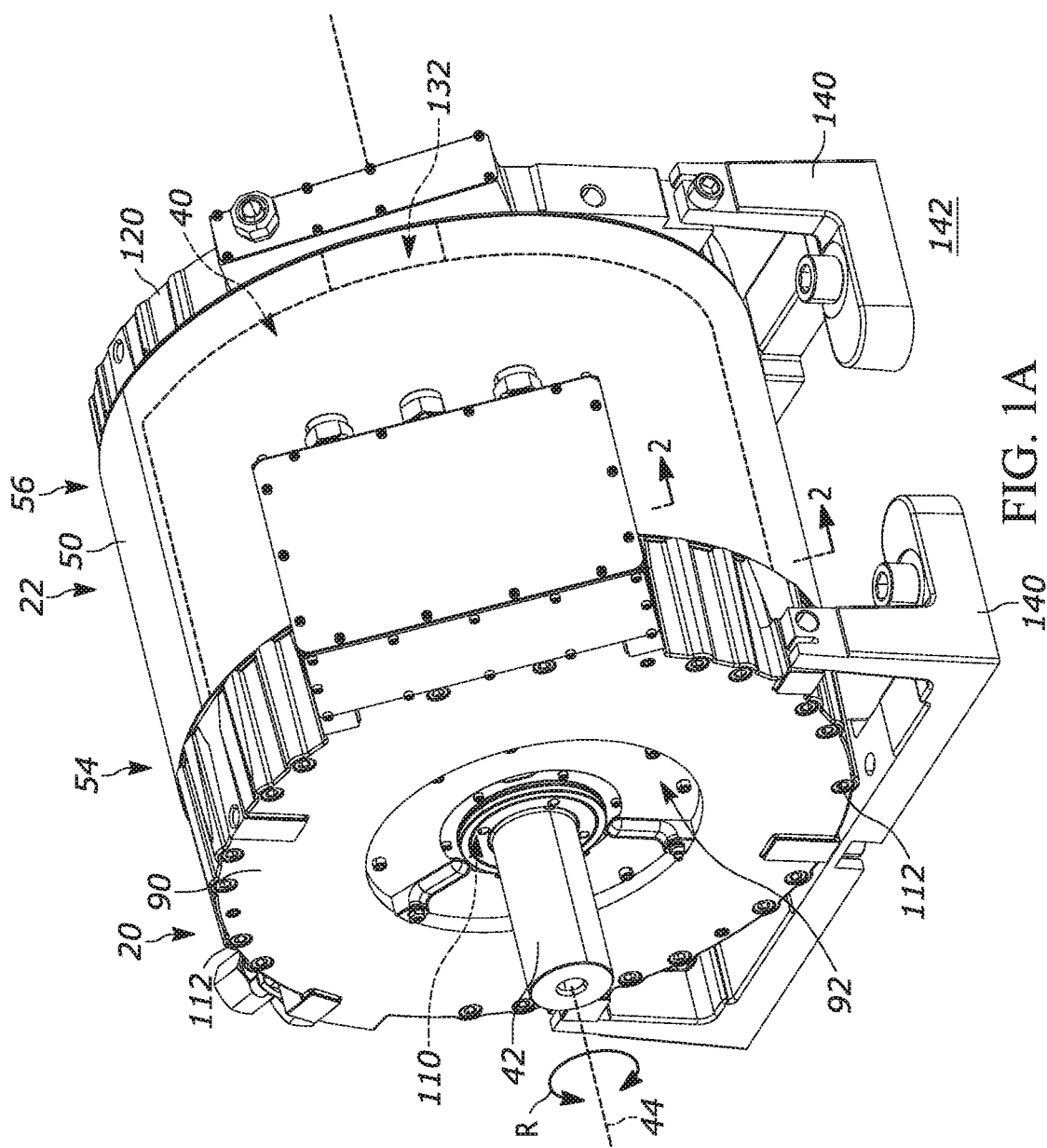
FIG. 1A is a front view of a rotary electric machine including an example stator housing.
Figure 1B:
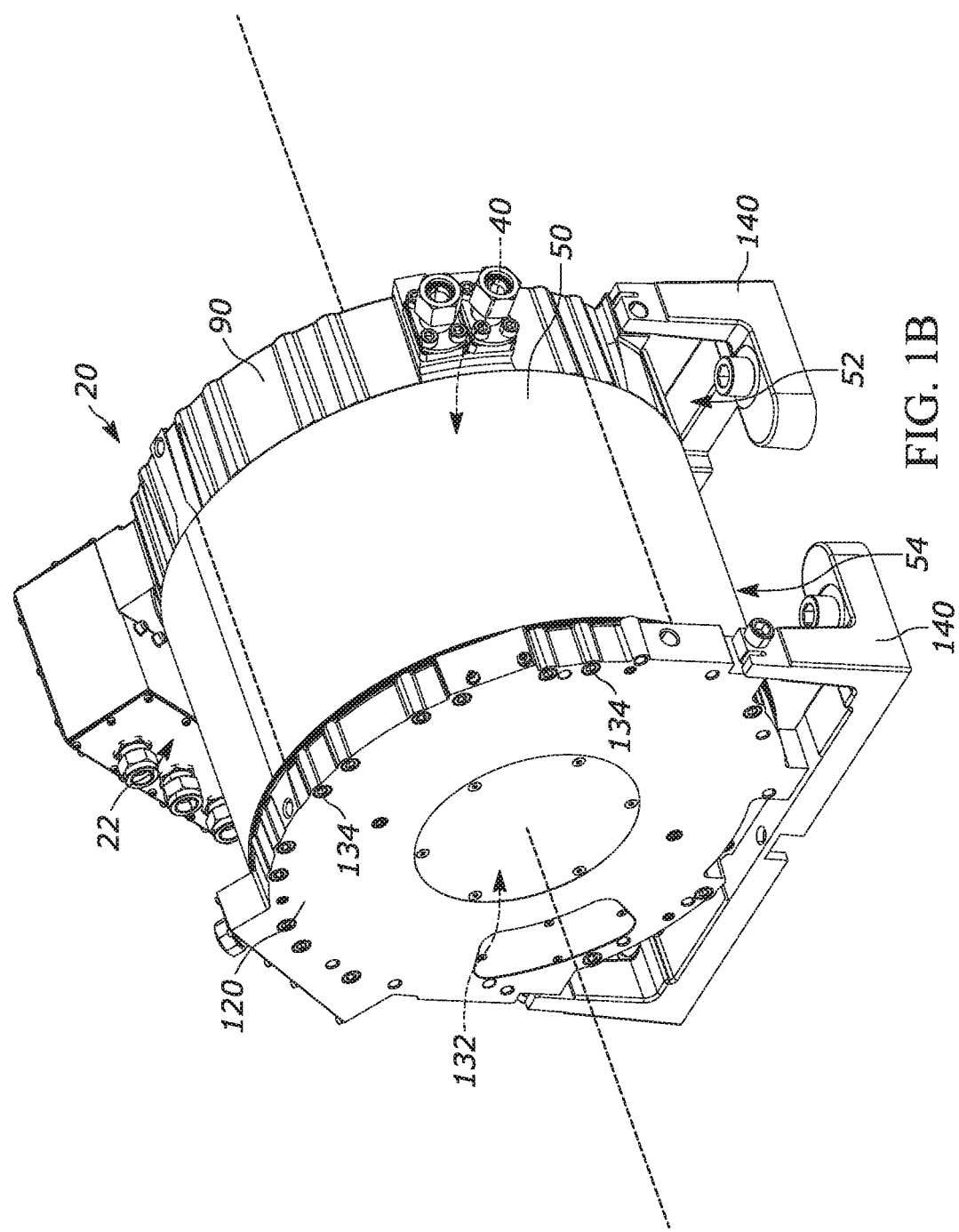
FIG. 1B is a rear view of the rotary electric machine of FIG. 1A.
Figure 2:
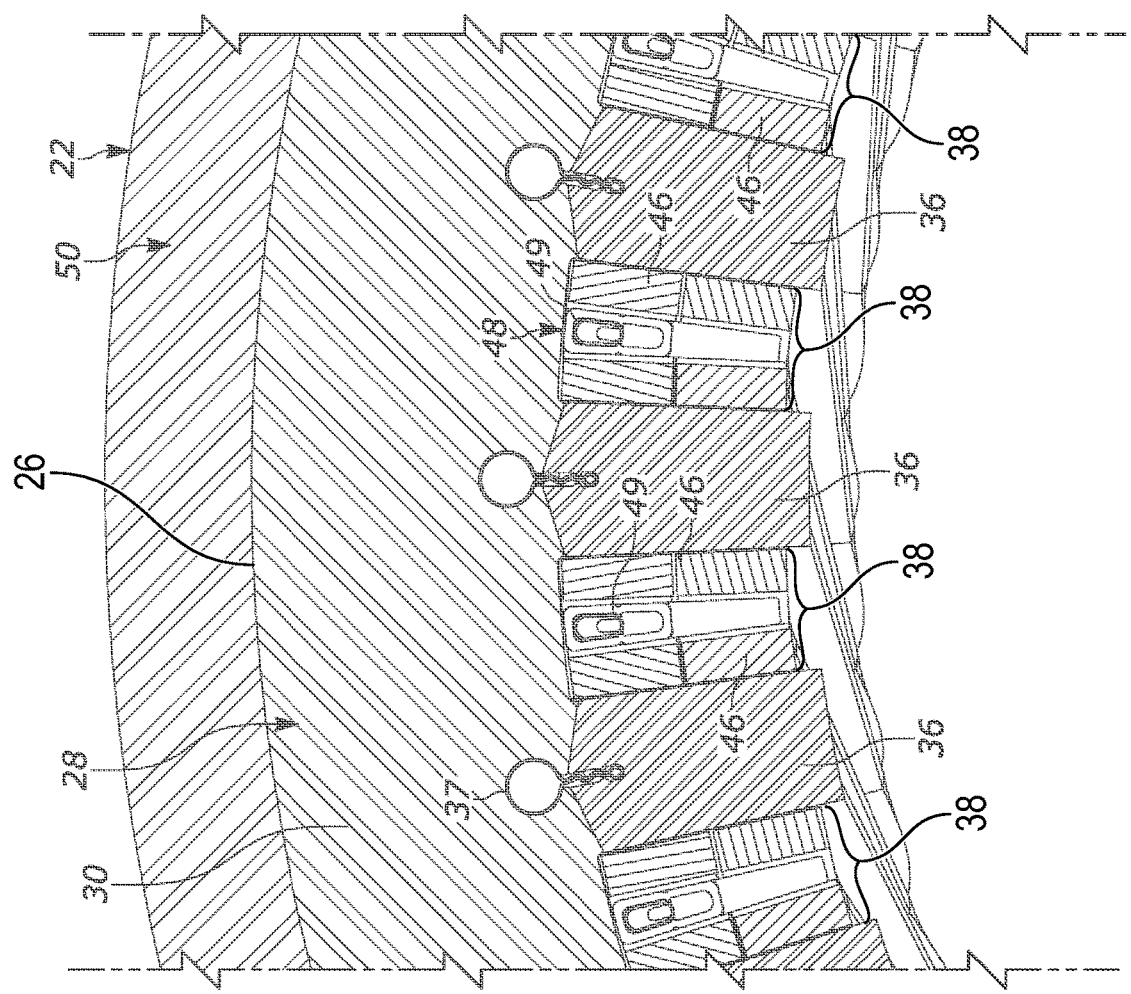
FIG. 2 is a section view of the rotary electric machine taken along lines 2-2 of FIG. 1A.

The present invention relates generally to rotary electric machines, and specifically to a housing for a stator. Referring to FIGS. 1A-2, one example rotary electric machine 20 includes a stator 22 and a rotor 40 capable of generating at least 10 kW of power. The rotor 40 is positioned within a passage 26 extending through the stator 22 and is rotatable about an axis 44 relative to the stator in the manner R.

As shown in FIG. 2, the stator 22 includes a ring-shaped core 28 formed from stacked laminations 30 made from an electrically conductive material, e.g., stainless steel. Teeth 36 extend radially inward from the core 28 towards the axis 44. The teeth 36 are arranged circumferentially about the axis 44 and extend substantially the entire axial length of the stator 22. The teeth 36 can be integrally formed with the core 28 or releasably connected thereto with tooth retention devices 37. Regardless, the teeth 36 are circumferentially spaced apart from one another by slots 38.

Windings or coils 46 formed from one or more conductors, e.g., electrically conductive material such as copper, are wound around the teeth 36 and pass through the slots 38. In one example, the windings 36 are wound in a 3-phase configuration such that a portion of the windings are in phase A, a portion of the windings are in phase B, and a portion of the windings are in phase C. Each phase A-C receives the same or substantially the same amount of current. Other phase configurations are contemplated. Multiple windings 46 can be electrically connected in series or in parallel and still receive the same amount of current. In a 3-phase configuration, phases can be connected in either a wye or delta configuration.

The windings 46 can be wound onto the stator 22 in any number of known manners, e.g., concentrated wound, distributed wound or hairpin wound. As shown, the windings 46 are formed from rectangular wire bent into a diamond shape and distributed wound around the teeth 36. The windings 46 are oriented in the slot 38 such that in cross-section the length (the longer dimension) extends radially towards the axis 44. The width (the smaller dimension) extends generally circumferentially about the axis 44. Multiple windings 46 in the same slot 38 are arranged abutting or adjacent one another in the radial direction and abutting or adjacent the associated tooth 36.

A circumferential space or gap 48 can be formed in each slot 38 between adjacent pairs of windings 46. A cooling device 49 is provided within each gap 48 for cooling the windings 46 during operation of the rotary electric machine 20.

Figure 3A:
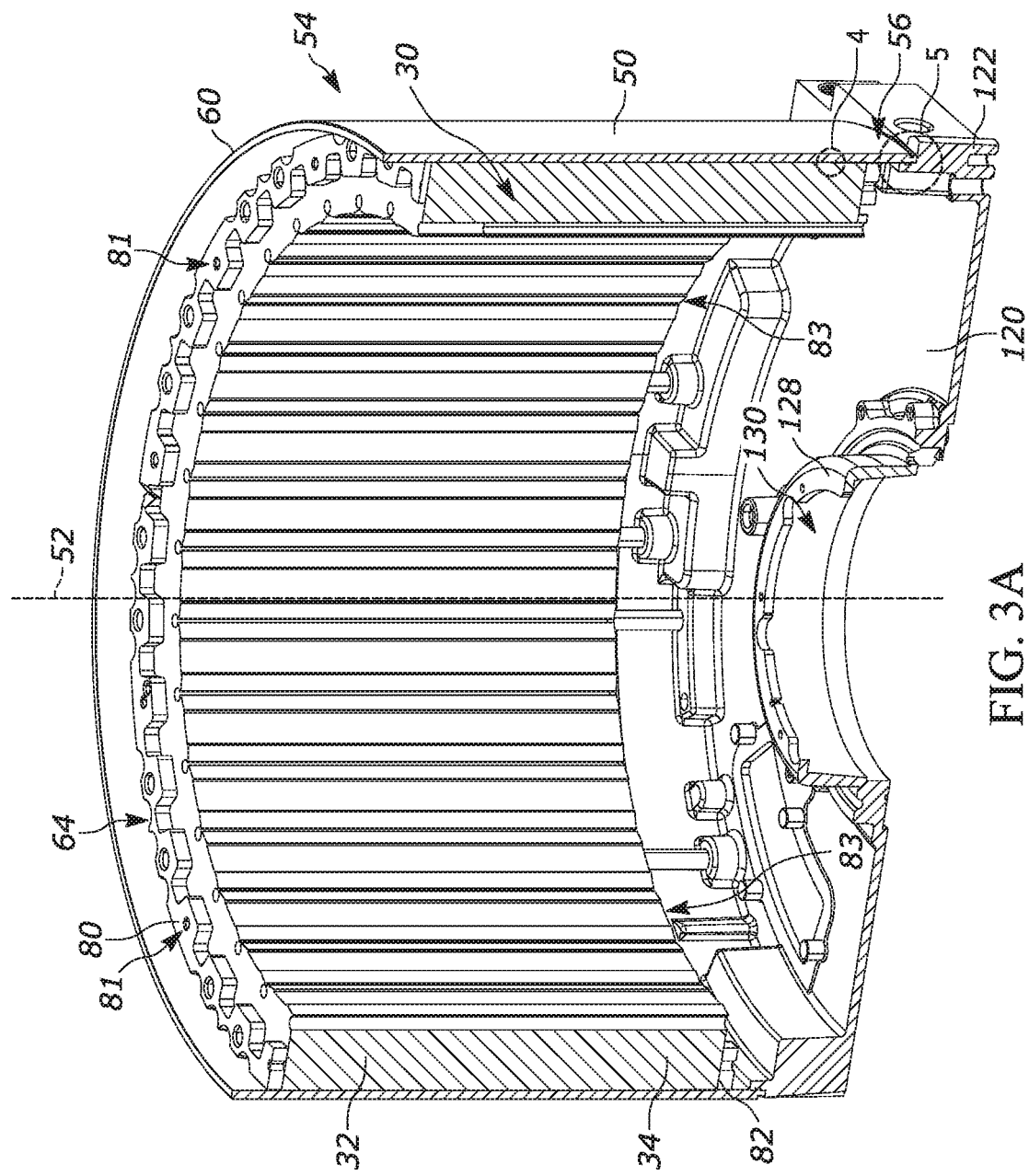
FIG. 3A is a section view of a portion of the stator.
Figure 3B:
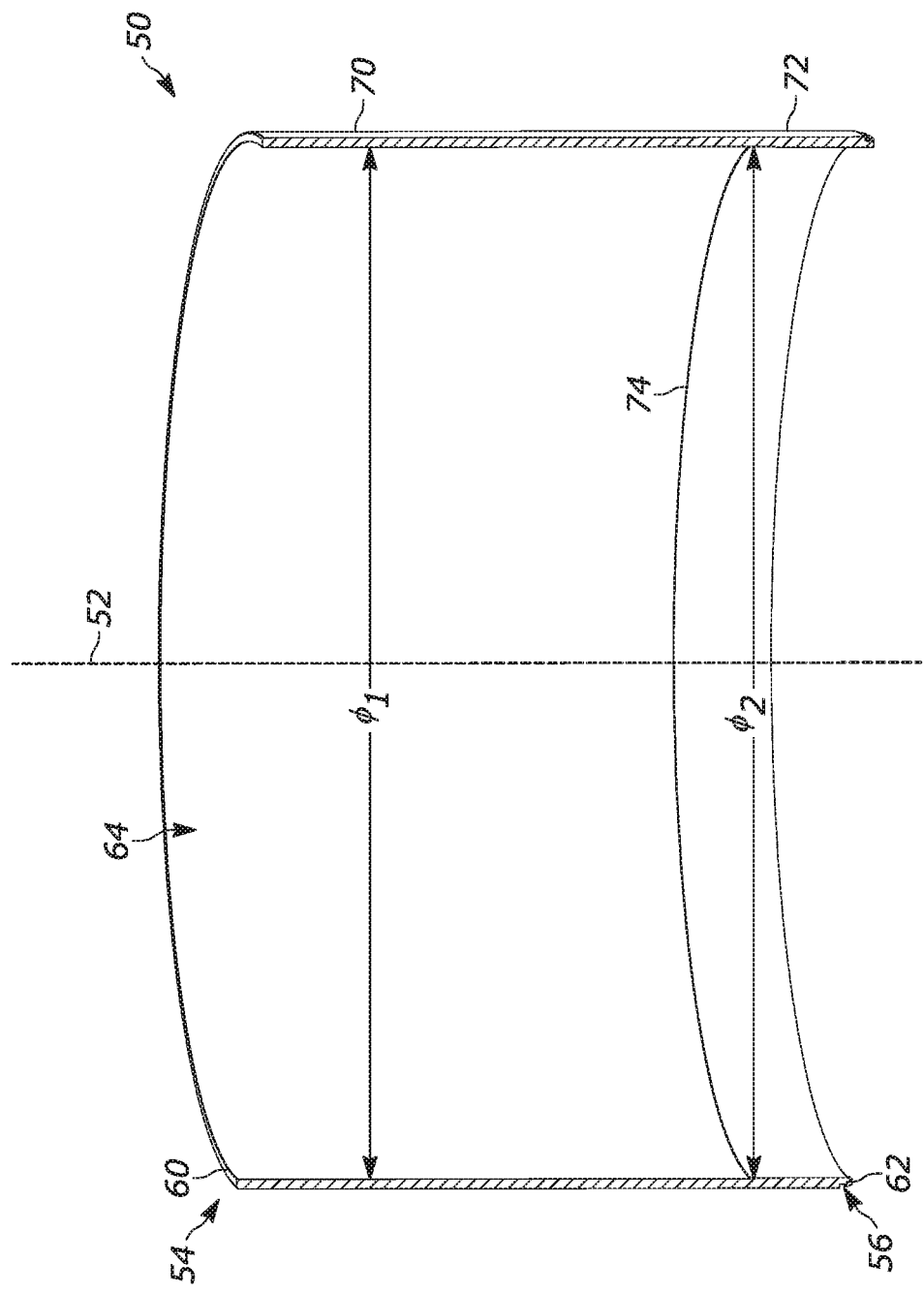
FIG. 3B is a section view of a housing of the stator.

Referring to FIGS. 3A-3B, the stator housing 50 extends along and about a centerline 52 from a first end 54 to a second end 56. The first end 54 terminates at an axial end surface 60. The second end 56 terminates at an axial end surface 62. The housing 50 is tubular and therefore defines a passage 64 extending its entire length. In one example, the housing 50 can have an outer diameter of at least about 20 cm. The housing 50 can have a uniform or substantially uniform, e.g., not varying by more than about ±10%, radial thickness along its entire length. The exterior of the housing 50 can be smooth, e.g., free of projections, along its entire length.

The housing 50 includes first and second portions 70, 72 arranged in an end-to-end manner with one another along the centerline 52. As shown, the first portion 70 includes the first end 54 and axial end surface 60. The second portion 72 includes the second end 56 and axial end surface 62. The first portion 70 has a first inner diameter $\Phi_1$. The second portion 72 has a second inner diameter 12 less than the first inner diameter $\Phi_1$. The first and second portions 70, 72 are separated by a shoulder 74. The shoulder 74 can extend transverse or perpendicular to the centerline 52.

Figure 4:
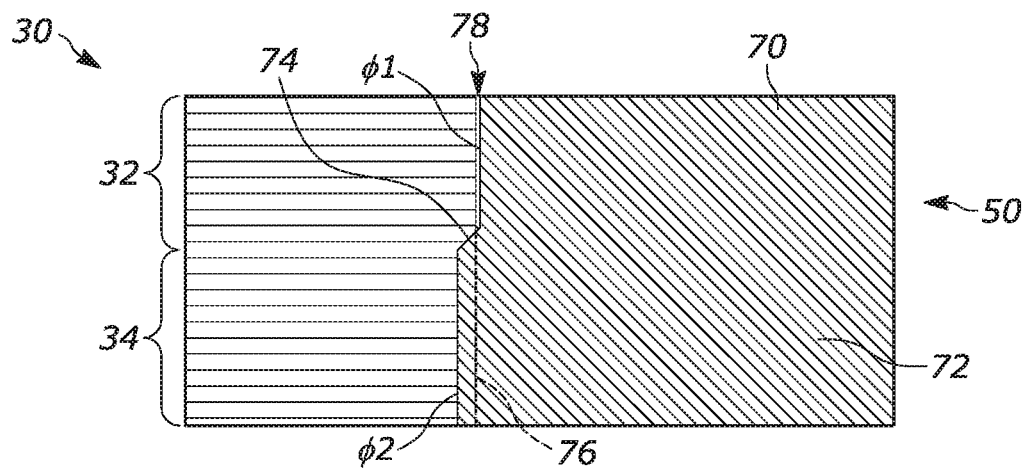
FIG. 4 is an enlarged view of a portion of FIG. 3A.

As shown in FIG. 4, the laminations 30 are positioned within the passage 64 and can interact or connect to the housing 50 in different ways. The laminations 30 can be provided within the passage 64 by insertion or shrink-fitting the housing over the laminations. In any case, the laminations 30 are separated into a first series or portion 32 and a second series or portion 34, each having the same size and shape. The first series 32 is radially aligned with the first portion 70 and configured to form a slip-fit therewith. Consequently, a radial gap 78 extends between the first series 32 and the first portion 70 up to the shoulder 74. The first series 32 extends to the first end 54 of the housing 50 but is spaced from the axial end surface 60 (see FIG. 3A). A stator top plate 80 is connected to the lamination 30 closest to the axial end surface 60. Threaded openings 81 are provided in the stator top plate 80.

The second series 34 is radially aligned with the second portion 72 of the housing 50 and configured to form a friction or interference fit therewith as indicated by the dashed lines 76. The second portion 34 extends longitudinally from the shoulder 74 to the second end 56 of the housing 50 but is spaced from the axial end surface 62 (see FIG. 3A). A stator bottom plate 82 is connected to the lamination 30 closest to the axial end surface 62. Threaded openings 83 are provided in the stator bottom plate 82.

The friction fit between the second series 34 and the second portion 72 enables the housing 50 to apply a radially directed compressive force on the second series. No compressive force, however, exists between the first series 32 and the first portion 70 due to the slip fit. Consequently, the magnetic performance of the first series 32 is maintained. The relatively smaller percentage of second series 34 compared to the first series 32 helps to ensure that the magnetic performance of the stator 22 is not appreciably affected due to its compressive fit with the second portion 72.

That said, the first series 32 of laminations is mechanically secured to the first portion 70 of the housing to help ensure a secure connection/interface between the housing 50 and the entire stack of laminations 30, This can be accomplished, for example, by welding, fasteners, etc. (not shown). The second series 34 of laminations can also be further secured (in addition to the interference fit 76) to the housing 50 by welding, fasteners, etc. (not shown). Consequently, the entire stack of laminations 30 is fixed to the housing 50 and therefore capable of transmitting torque thereto along its entire height.

It will be appreciated that two or more discrete sections of second series 34 can be provided in the stack of laminations 30, e.g., both longitudinal ends of the stack of laminations can include second series. In this construction, both longitudinal ends of the housing 50 can include the reduced diameter second portion 72 such that the stack of laminations forms an interference fit with a second series 34 at each end. The first series 32 would therefore be located between the pair of second series 34 (not shown).

In such a construction, the second portion 72 and, thus, the interference fit 76, can extend up to about 10% of the total length of the housing 50 from each end surface 60, 62. Consequently, the first series 32 of laminations 30 can occupy at least about the middle 80% of the entire length of the housing 50. There is therefore a much greater percentage of slip-fit connections between the laminations 30 and the housing 50 compared to interference fits. That said, hysteresis losses along the entire length of the housing 50 can be minimized due to the relatively smaller percentage of interference fit 76 with the stator 22 compared to the slip fit.

Referring back to FIGS. 1A-1B, an end bell 90 is connected to the first end 54 of the housing 50. A bearing assembly 110 is provided in the end bell 90 and rotatably receives the shaft 42 of the rotor 40. Fasteners 112 extend through the end bell 90 and threadably engage the openings 81 in the stator end top plate 80 to rigidly secure the end bell to the stator 22. Consequently, the fasteners 112 are positioned radially inward of the inner surface of the housing 50. The fasteners 112 have a length substantially less than a height of the laminations 30. Feet or support legs 140 are rigidly secured to the end bell 90 and to a mounting surface 142, e.g., a floor, wall, table, bracket, etc. The housing 50, end bell 90, and fasteners 112 can cooperate to form a subassembly of the rotary electric machine 20. Other components, e.g., support legs 140 and/or top plate 80, can be included in the subassembly.

An end cap 120 is connected to the second end 56 of the housing 50. The end cap 120 includes a second projection 128 defining an opening 130 for receiving a bearing assembly 132 (see also FIG. 1). The bearing assembly 132 receives the shaft 42 of the rotor 40 and cooperates with the bearing assembly 110 in the end bell 90 to center the rotor within the stator 22. Fasteners 134 extend through the end cap 120 and threadably engage the openings 83 in the stator bottom plate 82 to rigidly secure the end cap to the stator 22. Consequently, the fasteners 112, 134 cooperate to axially clamp the laminations 30 and housing 50 between the end bell 90 and the end cap 120. The degree of compressive force applied to the housing 50 and end cap 120 can be adjusted by adjusting the degree of threaded engagement between the fasteners 112 and/or 134 and the corresponding plates 80, 82.

Figure 5:
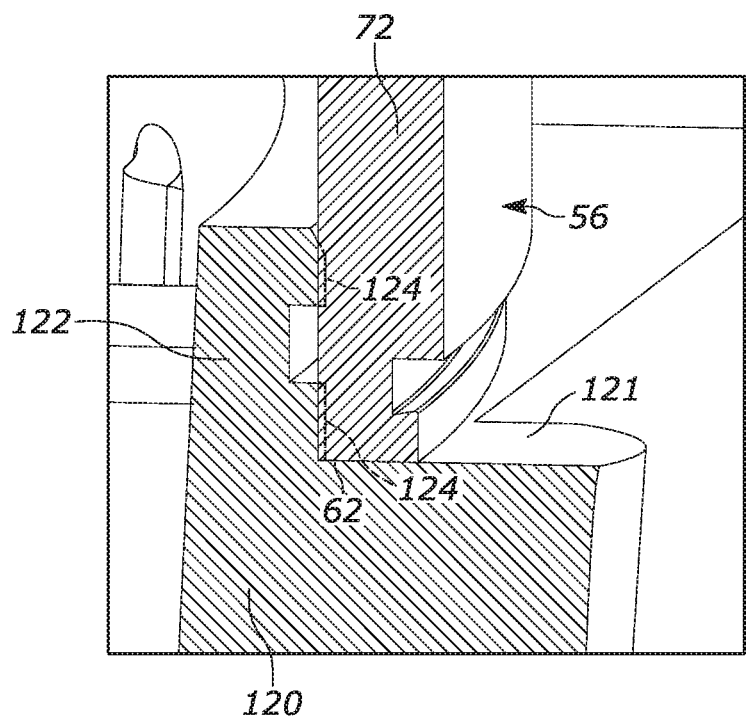
FIG. 5 is an enlarged view of another portion of FIG. 3A.

The end cap 120 is positioned adjacent the second series 34 of laminations 30 having the interference fit 76 with the second portion 72 of the housing 50. An interference or friction fit is provided between the end cap 120 and the housing 50 to align the housing with the end cap about the centerline 52, thereby locating the housing. More specifically, and referring to FIG. 5, the end cap 120 includes a first projection 122 sized to form an interference fit with the second portion 72 of the housing 50 as indicated by the dashed lines 124. Consequently, the laminations 30 are secured to the end cap 120 via the housing 50. In this construction, the axial end surface 60 of the housing 50 abuts an end surface 121 of the end cap 120.

The alignment of the stator 22 to the rotor 40 is controlled from the outer diameter of the stator, through the interference fit 76 to the housing 50, to the interference fit 124 with the end cap 120, and then through the end cap holding the bearing assembly 132.

During operation of the rotary electric machine 20, the rotating rotor 40 induces torque in the stator 22. This torque is transmitted from the stator 22 to the housing via the mechanical connections between the first series 32 and the first portion 70 in combination with the interference fit 76 between the second series 34 and the second portion 72.

Due to the clamping forces applied by the screws 112, 114 torque derived from operation of the rotary electric machine 20 is transmitted from the housing 50 and/or laminations 30 to both the end cap 90 and the end bell 120. More specifically, the screws 112, 114 help to press the axial end surfaces 60, 62 of the housing 50 against the end bell 90 and end cap 120 (see FIGS. 1A and 5), thereby helping to resist/prevent relative rotation between the housing and end bell/end cap. This frictional engagement therefore allows for torque transmission.

That said, increasing the compressive force provided by the screws 112, 114, the friction coefficient between the axial end surface(s) 60, 62 and the end bell 90 and/or end cap 120 can increase the amount of the torque that can be transmitted from the housing 50 to the end bell and end cap. The radius of the interface between the housing and end bell/end cap relative to the centerline 52 can also affect torque transmission. In any case, torque in the end bell 90 and end cap 120 is transmitted to the feet 140 and ultimately to the surface 142 secured to the feet.

The interface between the housing 50 and the stator laminations 30 advantageously allows the housing to align the end bell 90, which holds the bearing assembly 132 that aligns the rotor 40 with the stator 22. The inner diameter of the housing 50 therefore needs to be located very accurately to the outer diameter of the stator 22 in order to ensure all parts and assemblies are held coaxially with one another.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A housing for a rotary electric machine having stacked laminations forming a stator core, comprising:
    a first portion of a housing forming a slip fit with a first series of the stacked laminations; and
    a second portion of the housing forming an interference fit with a second series of the stacked laminations, wherein the second portion is provided on opposite longitudinal sides of the first portion.

2. The housing recited in claim 1, wherein the first portion is mechanically fastened to the first series.

3. The housing recited in claim 1, wherein the first portion has a welded connection with the first series.

4. The housing recited in claim 1, wherein the housing extends along a centerline with the interference fit aligning the housing coaxially with the stacked laminations.

5. The housing recited in claim 1, wherein the first and second portions are formed from stainless steel.

6. The housing recited in claim 1, wherein the rotary electric machine is configured to generate at least 10 kW of power.

7. The housing recited in claim 1, wherein the first and second portions each has an outer diameter of at least 20 cm.

8. The housing recited in claim 1, wherein the second portion is provided at only one end of the housing.

9. The housing recited in claim 1, wherein the housing extends along and about a centerline from a first end to a second end; wherein the first end terminates at a first axial end surface and the second end terminates at a second axial end surface; wherein the second portion extends up to about 10% or less of the entire length of the housing from each of the axial end surfaces.

10. The housing recited in claim 1, wherein the first and second portions are aligned with one another in an end-to-end manner.

11. The housing recited in claim 1, wherein the first and second portions are formed integrally with one another.

12. The housing recited in claim 1, wherein torque is transmitted from the second series to the second portion during operation of the rotary electric machine.

13. A housing for a rotary electric machine having stacked laminations forming a stator core, comprising:
    a first portion of a housing having a welded connection with a first series of the stacked laminations for transmitting torque from the first series to the first portion; wherein the first portion has a slip fit connection with the first series forming a gap therebetween in which the welded connection is provided; and
    a second portion of the housing forming an interference fit with a second series of the stacked laminations for centering the laminations and the housing about the same axis.

14. The housing recited in 14, wherein the housing extends along an axis from a first axial end surface to a second axial end surface and wherein the interference fit extends up to about 10% or less of the entire length of the housing from each axial end surface.

15. The housing recited in claim 13, wherein the housing is formed from stainless steel.

16. The housing recited in claim 13, wherein the rotary electric machine is configured to generate at least 10 kW of power.

17. The housing recited in claim 13, wherein the first and second portions each has an outer diameter of at least 20 cm.

18. The housing recited in claim 13, wherein the second portion has a welded connection with the second series.

19. A subassembly for a rotary electric machine having stacked laminations forming a stator core, comprising:
    a housing forming an interference fit with a series of the stacked laminations;
    an end cap having an interference fit with an end of the housing for locating the housing; and
    fasteners extending through the end cap for applying a compressive force to the stacked laminations for transferring torque between the end cap and the housing, the fasteners being positioned radially inward of the housing.

20. The subassembly recited in claim 19, wherein the fasteners have a length that is less than the height of the stacked laminations.

21. The subassembly recited in claim 19, further comprising a plate connected to an axial end of the stacked laminations and including threaded openings for receiving the fasteners to clamp the end cap to the stacked laminations.

22. The subassembly recited in claim 19, wherein the housing is formed from stainless steel.

23. The subassembly recited in claim 19, wherein the housing forms a slip fit connection with a second series of the stacked laminations to define a radial gap therebetween in which a welded connection is provided.

24. The subassembly recited in claim 19, wherein the rotary electricmachine is configured to generate at least 10 kW of power.

25. The subassembly recited in claim 19, wherein the first and secondportions each has an outer diameter of at least 20 cm.

26. The subassembly recited in claim 19, further comprisingfeet secured to the end cap for securing the end cap to a mounting surface.

\* \* \* \* \*